Dec. 7, 1954  J. C. WILLIAMS  2,696,556
FREQUENCY DIVISION
Filed Oct. 31, 1951  5 Sheets-Sheet 1
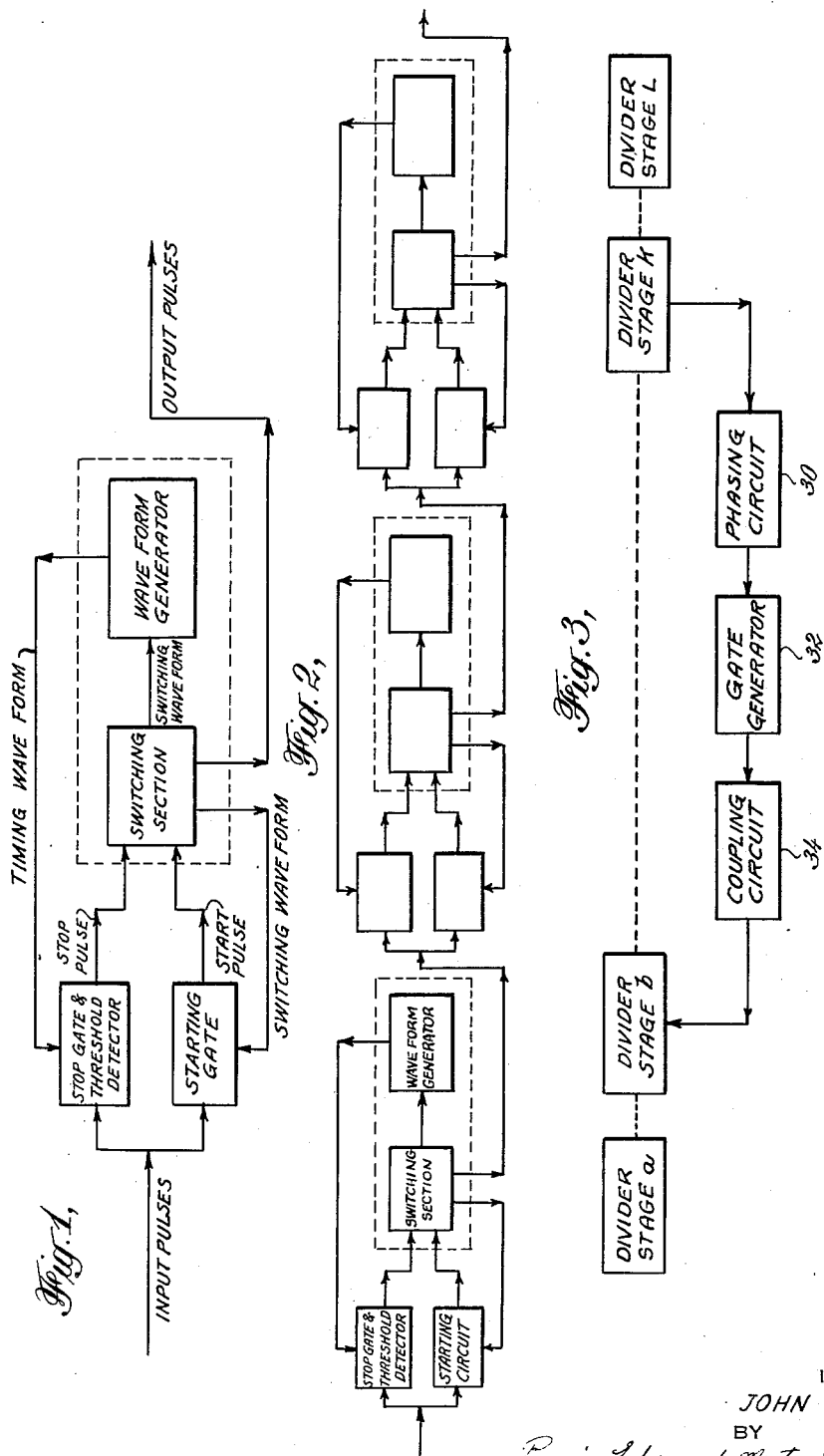
INVENTOR
JOHN C. WILLIAMS
BY
Pennie, Edmonds, Morton, Barrows and Taylor
ATTORNEYS Dec. 7, 1954  J. C. WILLIAMS  2,696,556
FREQUENCY DIVISION
Filed Oct. 31, 1951  5 Sheets-Sheet 2

INVENTOR
JOHN C. WILLIAMS

Dec. 7, 1954    J. C. WILLIAMS    2,696,556
FREQUENCY DIVISION
Filed Oct. 31, 1951    5 Sheets-Sheet 3
Fig. 7,
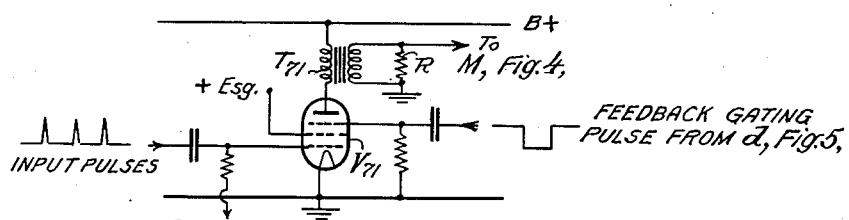
Fig. 8,
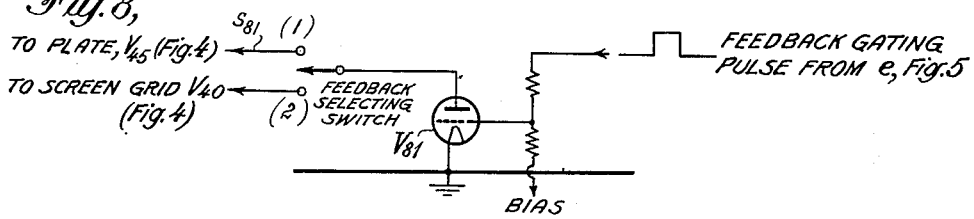
Fig. 9,
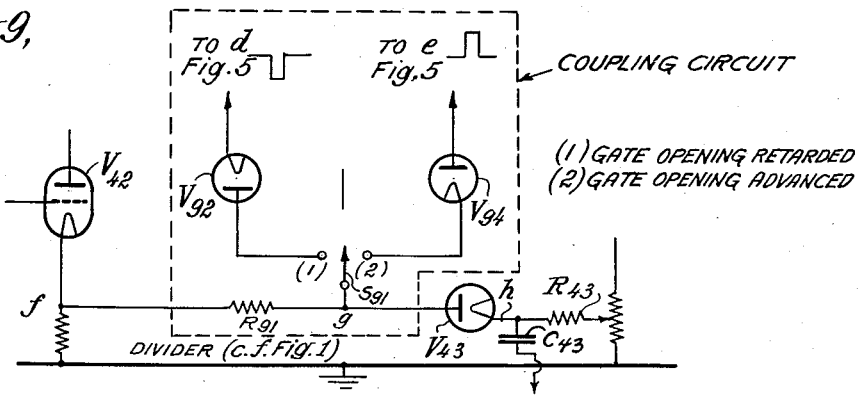
Fig. 10,
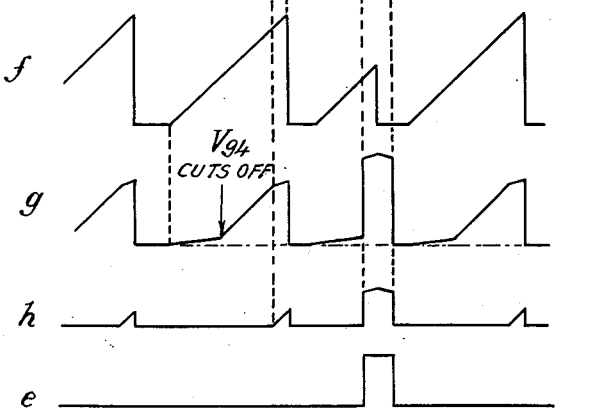
INVENTOR
JOHN C. WILLIAMS
BY
Pennie, Edmonds, Morton, Barrows and Taylor
ATTORNEYS Dec. 7, 1954  J. C. WILLIAMS  2,696,556
FREQUENCY DIVISION
Filed Oct. 31, 1951  5 Sheets-Sheet 4

INVENTOR
JOHN C. WILLIAMS
BY Pennie, Edmonds, Morton, Barrows and Taylor
ATTORNEYS Dec. 7, 1954  J. C. WILLIAMS  2,696,556
FREQUENCY DIVISION
Filed Oct. 31, 1951  5 Sheets-Sheet 5
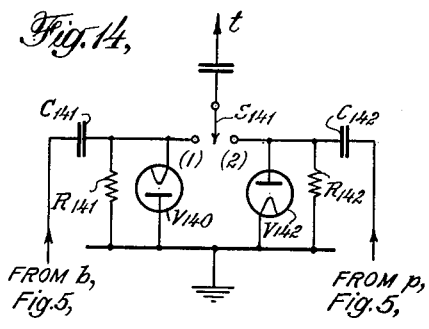
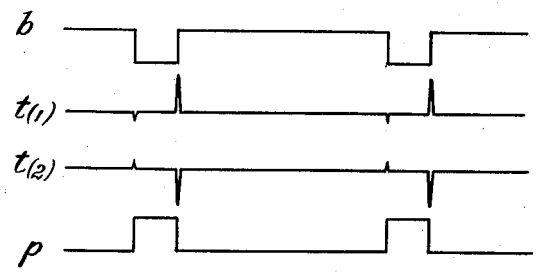
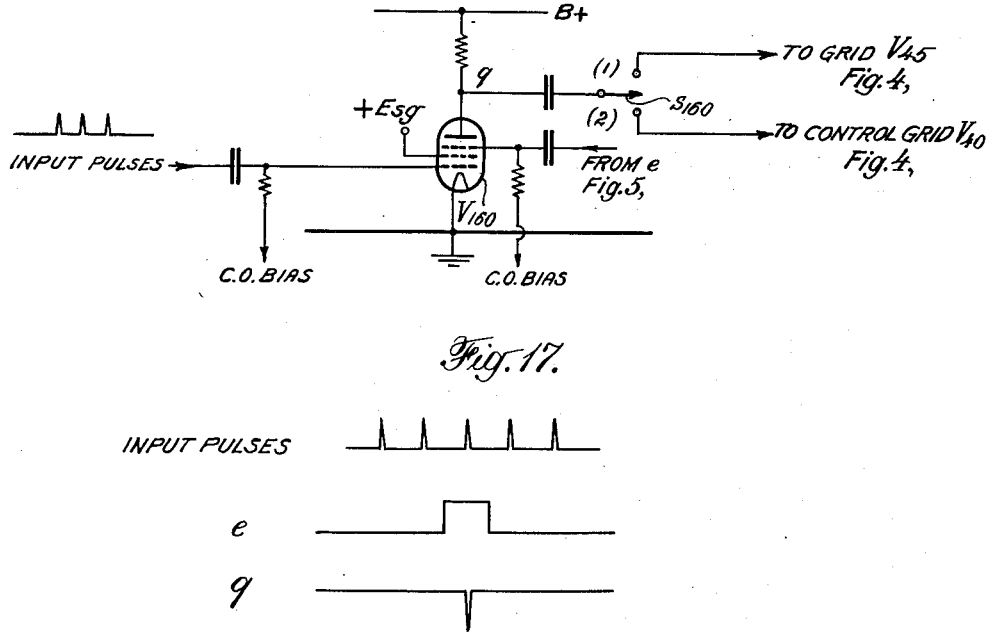
INVENTOR
JOHN C. WILLIAMS
BY
ATTORNEYS United States Patent Office 2,696,556
Patented Dec. 7, 1954

2,696,556

FREQUENCY DIVISION

John C. Williams, Cambridge, Mass.

Application October 31, 1951, Serial No. 254,165

19 Claims. (Cl. 250—27)

This invention relates to frequency division and more particularly to control of the over-all division ratio in a frequency dividing device employing two or more gated frequency dividing circuits of the type disclosed in my copending application Serial No. 133,057, filed December 15, 1949, now Patent No. 2,660,668.

While a gated frequency dividing circuit as disclosed in my copending application above-identified is capable of producing an output signal having a repetition rate as much as ten or twenty times lower than the repetition rate of the input signal, it is sometimes desirable to divide an available signal by a much larger factor. Thus when signals having frequencies of the order of a few cycles per second are to be produced with a highly accurate recurrence rate, they may advantageously be produced by a process of division from a signal generated in a crystal oscillator having a natural frequency of the order of fifty or one hundred thousand cycles per second. To effect division by factors of this order of magnitude a number of frequency dividing stages are cascaded together, the output or quotient signal of each stage serving as input or dividend signal to the succeeding stage. Frequency dividing circuits as described in my copending application Serial No. 133,057 are well adapted to be so employed.

If two or more frequency dividing circuits or stages are so cascaded together, the over-all division ratio of the cascade will be the product of the ratios of the separate stages. Accordingly, the least amount by which the overall division ratio can be changed by changing the ratio of any one stage is the product of the ratios of all the other stages. This is a serious limitation when it is desired to produce from a single crystal any one of a number of closely spaced frequencies all lower than the frequency of the crystal by a factor of one hundred or more for example. The present invention permits changing the over-all division ratio of a cascade of frequency dividing circuits by much smaller amounts than the least product of all stages except one, and it employs therefor signals of substantially arbitrary nature derived from any stage subsequent to the first.

It has been proposed heretofore to alter the division ratio of a cascade of step charging frequency dividers by means of increments of charge fed back from a later to an earlier stage. This method is subject to the usual disadvantages of devices depending for their operation on the production and detection of absolute increments of charge.

The present invention takes advantage of the characteristic feature of a gated frequency divider by virtue of which the electron tubes thereof function only as switches, controlling the generation of a characteristic waveform or waveforms between intervals which are determined by such switch tubes at an integral number of periods of the signal to be divided. These switch tubes are controlled by switching signals which are not critical as to amplitude. This permits the use according to the present invention of trigger signals derived from waveforms in a later stage, suitably phased and shaped, to hasten or retard the termination of a characteristic waveform in a prior stage. The advantages of independence of supply voltages and of the age and condition of circuit elements which characterize the gated frequency dividers themselves are thereby retained in cascading such dividers and in providing the cascade with a variable over-all division ratio. Moreover, my invention provides means for increasing as well as for decreasing the over-all division ratio of the cascade.

Another advantage of the circuits of the present invention is that the state of adjustment of the feedback circuit can be observed on an oscilloscope, positively, accurately and unambiguously, without interference with the operation of the dividing cascade.

In most cases the waveform at the normal inspection point of the divider stage to which feedback is applied will provide this indication of the state of feedback adjustment.

In a gated frequency divider the output or quotient signal is always integrally related in period and frequency to the input or dividend signal because the initiation and termination of the characteristic waveform is always produced by a cycle of the input or dividend frequency. The use according to the invention of feedback trigger signals derived from a later stage in a cascade of such dividers, fed back to an earlier stage to terminate prematurely or to prolong a characteristic waveform in the earlier stage leaves the output signal period of the earlier stage an integral multiple of the period of the input signal thereto. The circuits of the invention therefore also produce frequency division by integral factors.

According to the invention, alteration in the length of the quotient cycle of the earlier stage to which the trigger signals (or signals derived therefrom) are applied has an additive (not a multiplicative) effect on the length of the quotient cycle of the later or "feedback" stage from which the trigger signals are drawn. If the stage operated on is the first, and if the feedback stage is the last of the cascade, the over-all division ratio will be changed by a small integral number such as one, two, three, etc. That is, the period of the output cycle from the last stage will be increased or decreased in length by a small integral number of periods equal to the period of the input signal to the first stage.

If the stage operated on is subsequent to the first, the least change in over-all division ratio will be equal to the number given by the ratio of the input frequency to the first stage to the input frequency to the stage operated on. If the feedback stage is prior to the final stage, the change in over-all division ratio as conditioned by the stage operated on will be multiplied by the ratio of the output frequency of the feedback stage to that of the final stage. Thus in general the change in over-all frequency division ratio is the product of the number of input pulse periods to the stage operated on by which the output period of that stage is changed when a feedback signal is applied, multiplied by the ratio of the initial input frequency to the input frequency of the stage operated on multiplied by the ratio of the output frequency of the feedback stage to the final output frequency of the cascade. My invention contemplates alteration in the over-all frequency of a cascade in any one of these ways.

The invention will now be described in detail with reference to the accompanying drawings in which Fig. 1 is a block diagram of a gated frequency divider;

Fig. 2 is a block diagram of a cascade of divider stages each including one gated frequency divider of the type shown in Fig. 1;

Fig. 3 is a block diagram showing a cascade of gated frequency dividers together with a feedback circuit according to the invention altering the divider ratio of the cascade;

Fig. 4 is a schematic diagram of one form of gated frequency divider as disclosed in my copending application above referred to;

Fig. 5 is a schematic diagram of a preferred form of feedback circuit including a phasing circuit and gate generator suitable for use in the feedback circuit shown in block form in Fig. 3;

Fig. 6 is a set of waveforms useful in explaining the operation of the phasing circuit and gating waveform generator of Fig. 5;

Fig. 7 is a schematic diagram of a form of coupling circuit useful when the feedback signal is employed to increase the divider ratio of the cascade by withholding input pulses to the stage operated on by the feedback circuit;

Fig. 8 is a schematic diagram of another form of coupling circuit according to the invention which operates to increase the divider ratio of the cascade by rendering the stage operated on insensitive to the input pulses supplied thereto;

Fig. 9 is a schematic diagram illustrating two forms of coupling circuit according to the invention effecting advance or retardation in the opening of the start or stop gate in the stage operated on, together with certain elements of that stage;

Fig. 10 is a diagram of certain waveforms useful in explaining the operation of the circuit of Fig. 9 when employed for reduction of the divider ratio of the cascade;

Fig. 14 is another form of coupling circuit according to the invention permitting direct injection of the divider ratio changing feedback pulse to the switching section of the divider stage operated on;

Fig. 15 is a diagram of certain waveforms useful in explaining the operation of Fig. 14;

Fig. 16 is a schematic diagram of another form of coupling circuit according to the invention serving to preserve an integral divider ratio for the cascade; and Fig. 17 is a diagram of certain waveforms useful in explaining the operation of the circuit of Fig. 16.

Figure 11:
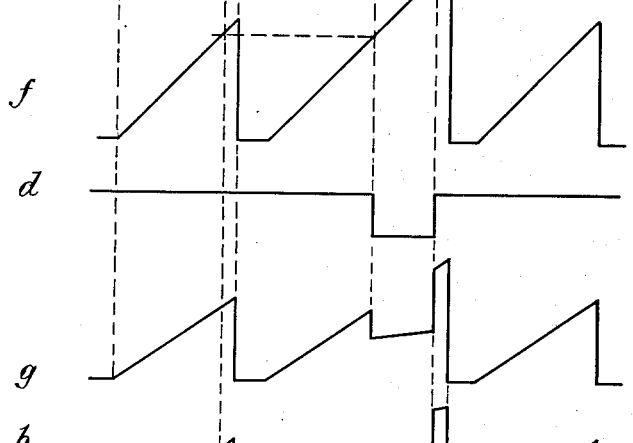
Fig. 11 is a diagram of certain waveforms useful in explaining the operation of the circuit of Fig. 9 when used to increase the divider ratio of the cascade.

The gated frequency divider shown in general form in Fig. 1 includes four principal components. A waveform generator, usually including a condenser charging or discharging circuit controlled by a switch tube, generates a characteristic waveform whose repetition rate is the quotient frequency of the stage. The waveform generator is driven by a closely associated switching section. The switching section is preferably a combination of one or more electron discharge devices having two modes of conduction of which one is stable and the other unstable. The switching section when in its unstable mode of conduction causes the waveform generator to generate its characteristic (saw-tooth) waveform, for a period limited to an integral number of periods of the input signal to the divider. When the switching section is in its stable mode, the waveform generator is passive, and its elements recycle or restore themselves to the quiescent condition from which the characteristic waveform is again initiated.

Input pulses representative of the signals to be divided in frequency are fed to the switching section through a starting gate to shift the switching section to its unstable mode, and through a stop gate controlled by a threshold detector to return the switching section to its stable mode. The starting and stop gates are opened and closed by signals derived from the waveform generator or from the switching section so that the starting gate is open (passes signals) only when the switching section is in its stable mode, and the stop gate is open (passes signals) only when the characteristic waveform voltage exceeds, positively or negatively, the value specified by the threshold detector.

There occur in the switching section and in the waveform generator voltage waveforms which are discontinuous. From these discontinuities sharp pulses may be derived which serve as output signals for the divider.

Fig. 2 illustrates the cascading of three dividers of the type shown in Fig. 1, each divider constituting a stage in the resulting cascade; the number of stages which can be cascaded together is not limited.

In Fig. 3 a cascade of gated frequency dividers as shown in Fig. 2 is combined with a feedback circuit according to the invention adapted to alter the over-all divider ratio of the cascade by an amount which may be much smaller than the least product of the individual ratios of all stages in the cascade except one. According to the general method of the invention the over-all divider ratio of a cascade of $n$ gated frequency dividers is altered by drawing from a stage $k$ subsequent to the first (and which may or may not be the last stage of the cascade) a signal at the output frequency of such $k$th stage and applying it to a prior stage $b$ in the cascade in such a manner as to change the divider ratio of the stage $b$ for one cycle of that stage each time the feedback pulse is applied. The $b$th stage may or may not be the first in the cascade, and the $b$th and the $k$th may or may not be adjacent stages. The feedback loop of the invention typically includes a phasing circuit 30, a gating waveform generator 32 and a coupling circuit 34. The phasing circuit and gating waveform generator are both preferably adjustable in order to permit variation of the change effected in the over-all divider ratio for the cascade. The coupling circuit 34 is provided to make suitable application of a gating waveform to the $b$th stage, to which feedback is applied.

Before describing in detail the feedback circuit of the invention there will be described with reference to Fig. 4 a typical form of gated frequency divider from which may be drawn and to which may be applied the ratio changing feedback pulses employed according to the invention. In the gated frequency divider shown in Fig. 4 the waveform generator comprises a condenser $C_{41}$ charged through a resistor $R_{42}$, together with the plate-cathode discharge path of tube $V_{40}$ and its cathode resistor $R_{40}$. $V_{42}$, $C_{42}$ and $V_{46}$ form a linearizing circuit which renders nearly straight the slope of the saw-tooth voltage on the plate of $V_{40}$. This saw-tooth is reproduced on the cathode of $V_{42}$. The saw-tooth generator is turned on and off by the plate-cathode path of pentode $V_{40}$ functioning as a switch.

The switching section consists of the triode $V_{45}$ and of a second triode formed by the screen grid, control grid, and cathode of $V_{40}$. These two triodes are connected together as a monostable delay multivibrator. The time constant of this multivibrator is chosen larger than the maximum length of saw-tooth to be employed so that the circuit never returns spontaneously to the stable mode except when the input pulses are discontinued. In the stable mode of conduction screen current flows in $V_{40}$, and $V_{45}$ is cut off. The waveform generator as a whole thus includes $V_{40}$, $V_{42}$, $V_{45}$ and $V_{46}$.

The start gate is provided by $C_{47}$, $V_{40}$ and $R_{40}$, the cathode resistor of $V_{40}$. The stop gate includes the threshold diode $V_{43}$, the threshold potentiometer $R_{44}$, $R_{45}$, and the pentode $V_{44}$. $R_{44}$, $R_{45}$ is connected between the same limits of potential E as the saw-tooth generator. Input pulses for starting are applied through $C_{47}$ to the cathode of $V_{40}$ and for stopping to the suppressor grid of $V_{44}$, in which the gating voltage is applied to the control grid.

With no input pulses, the switching section is in its stable mode. $V_{40}$ is conducting with its grid at zero bias. $V_{45}$ is off as the other half of the multivibrator and $V_{44}$ is off by bias on its control and suppressor grids, each grid being beyond its own cutoff level. The plate of $V_{40}$ is close to ground potential. A series of positive going pulses derived by conventional means not shown from the frequency to be divided is applied to the circuit at M. The first arriving pulse finds $V_{44}$ insensitive due to control grid bias. However it cuts off conduction in $V_{40}$ by raising the cathode thereof. The screen of $V_{40}$ rises, bringing $V_{45}$ into conduction. The resulting multivibrator action between $V_{45}$ and the screen grid-cathode path of $V_{40}$ drives the control grid of $V_{40}$ beyond cutoff. $V_{40}$ thus remains cut off even after the end of the positive pulse.

The succeeding input pulses have no effect since $V_{44}$, to which they are applied with an effective positive polarity, remains cut off on its control grid and since $V_{40}$, to which they are applied with an effective negative polarity, is already cut off. The anode of $V_{40}$, previously at a very low positive potential with respect to ground, now rises according to a modified exponential. A linearizing circuit consisting of $V_{46}$, $C_{42}$, and $V_{42}$ renders the charging curve nearly linear. Because of the substantially unity gain of the cathode follower $V_{42}$, the potential on the anode of $V_{43}$ is of the same form as that on the plate of $V_{40}$. When the anode of $V_{43}$ rises above the threshold level established for the cathode of $V_{43}$ by the setting of the potentiometer $R_{44}$, $R_{45}$, $V_{43}$ conducts. The time at which the output of $V_{43}$ begins can evidently be controlled by variation in the threshold level at the potentiometer $R_{44}$, $R_{45}$.

The output of $V_{43}$ is applied to the control grid of $V_{44}$ through a blocking condenser $C_{43}$ and limiting resistor $R_{46}$. It lifts the grid of $V_{44}$ to zero bias and holds it there as long as the saw-tooth of $V_{43}$ remains above the threshold level.

When the next input pulse arrives, it finds $V_{40}$ still cut off by multivibrator action but it swings the suppressor of $V_{44}$ substantially above cutoff, and plate current flows in $V_{44}$. As the plate of $V_{44}$ falls, even though only for the duration of the input pulse, it cuts off $V_{45}$ and reverses the conducting phase in the multivibrator. This restores $V_{40}$ to conduction at zero bias and produces rapid discharge of the condenser $C_{41}$. The control grid of $V_{40}$ returns to zero, its screen grid drops and the plate of $V_{45}$ rises as that tube is cut off. For the remainder of the input cycle, the circuit is at rest, and the elements restore themselves to their initial conditions.

The next arriving input pulse finds the circuit in the condition which existed on the arrival of the first pulse, and the cycle of the quotient or output frequency begins again.

Accurately timed output pulses having the repetition rate of the quotient frequency may be obtained by differentiating any of several waveforms. For example, the peaker comprising $C_{46}$ and $R_{48}$ provides both positive and negative pulses at this frequency from the screen grid of $V_{40}$, and either the positive or negative pulses may be selected for use, as desired.

A phasing circuit and gating waveform generator according to the invention are shown in schematic form in Fig. 5. The circuit of Fig. 5 makes available both positive and negative gates at the repetition rate of the quotient signal in the $k$th stage from which the feedback signal is drawn and of adjustable phase with respect thereto. Both the phasing circuit and gating waveform generator take the form of cathode coupled monostable multivibrators. In Fig. 5 $V_{51}$ and $V_{52}$ constitute the phasing circuit, and $V_{53}$ and $V_{54}$ constitute the gating waveform generator. Positive pulses at the quotient frequency of the $k$th stage are applied to the grid $a$ of the normally non-conducting tube $V_{51}$ and produce a negative-going gate at its plate $b$. Waveforms at the points $a$, $b$ and at additional points $p$, $c$, $d$ and $e$ in the circuit of Fig. 5 are shown in Fig. 6. The duration of this gate is controlled by adjustment of the bias to which the grid of $V_{51}$ is returned on potentiometer $R_{51}$. The trailing edge of the phasing gate at the plate of $V_{51}$ is differentiated at $C_{51}$ and $R_{52}$ to provide a positive trigger for the gating waveform generator of $V_{53}$ and $V_{54}$. The waveform at $d$ in the plate of normally non-conducting tube $V_{53}$ is therefore a negative gate while the waveform at $e$ on the plate of $V_{54}$ is a positive gate of the same width. The gate width is adjusted at potentiometer $R_{53}$. The phasing circuit and gating waveform generator of Fig. 5 therefore provide together in the feedback loop of Fig. 3 both positive and negative gates of adjustable phase and width for alteration of the divider ratio in the $b$th stage of the cascade to which they are applied.

One form of coupling circuit according to the invention is shown in Fig. 7, employed to increase the over-all divider ratio by withholding one or more input pulses to the $b$th stage. In Fig. 7 pentode $V_{71}$ is connected to receive on its suppressor grid the negative gating waveform from $d$ in the plate circuit of tube $V_{53}$ in the gating waveform generator of Fig. 5. The control grid is biased to cutoff but receives positive input pulses from the stage preceding stage $b$ to which the feedback signal is to be applied. In the absence of the feedback gate at the suppressor grid, negative pulses appear on the plate of $V_{71}$ where they are inverted in a transformer $T_{71}$ for application to the $b$th divider stage as at the point M in Fig. 4. When the feedback gate appears, $V_{71}$ is cut off on the suppressor grid and no input pulses are permitted to appear on its plate. The phasing circuit of the feedback loop should be adjusted to bring the leading edge of the withholding gate approximately half a pulse period before the input pulse to the $b$th stage which produces one of the reversals in conduction phase of the switching section in that stage. The withholding gate may have a length such as to withhold one or more input pulses. Of course the withholding circuit of Fig. 7 may be inserted either in the path of the input pulses to the $b$th stage itself or within that stage in the line of either the start or stop pulses alone. Thus with reference to the example of Fig. 4 the withholding circuit if inserted between point N and the cathode of $V_{40}$ will be effective on start pulses only whereas if inserted in the stop line between N and the gating tube $V_{44}$, it will be effective on stop pulses only.

The gating waveform of the withholding gate generator 32 in Fig. 3 may be applied not only to withhold input pulses according to the embodiment of Fig. 7 but to clamp the switching section of the $b$th stage in either of its modes of conduction. Fig. 8 illustrates a form of coupling circuit effecting change in divider ratio in this manner. Like that of Fig. 7 the coupling circuit of Fig. 8 is effective only to increase the over-all divider ratio. In Fig. 8 a triode $V_{81}$ is provided with cut off bias on its grid and has its plate connected via switch $S_{81}$ either to the plate of $V_{45}$ or to the screen grid of $V_{40}$ (Fig. 4) in the $b$th stage of the cascade, according as increase in the divider ratio is to be effected by clamping the $b$th stage in its active or passive mode of conduction. The positive gating waveform at the plate of $V_{54}$ in Fig. 5 is applied to $V_{81}$ to lift that tube from cutoff to zero bias. When so lifted, it holds the tube $V_{45}$ or $V_{40}$ of Fig. 5 in a conducting condition regardless of the arrival of starting pulses at the cathode of $V_{40}$ or of stopping pulses at the suppressor grid of $V_{44}$. Of course the switch $S_{81}$ is not a necessary element of the coupling circuit of Fig. 8; the plate of $V_{81}$ will typically be connected permanently to either the plate of $V_{45}$ or the screen grid of $V_{40}$. The phasing circuit of the feedback loop is set as with the coupling circuit of Fig. 7, to initiate the gate approximately one half an input pulse period to stage $b$ before either the normal starting or stopping pulse from the preceding stage. Gate width should be set at an integral number of pulse periods.

Change in the over-all divider ratio of a cascade of dividers is also effected according to the invention by use of a feedback signal to advance or retard the opening of the stop or start gate in the stage of the cascade to which the feedback signal is applied. For example a gate-shaped voltage may be used to raise or to lower the threshold voltage in the $b$th stage, thereby postponing or advancing the time when the threshold voltage is reached and the stop gate opened, or the feedback signal may be employed to alter the characteristic waveform, which is measured in duration by its approach to the level established in the threshold detector, in order to change the time required by such characteristic waveform to reach the level of the threshold detector. Two preferred embodiments of the invention operating by advance or retardation in the opening of the stop gate are illustrated in the coupling circuits of Fig. 9 and the waveform diagrams of Figs. 10 and 11.

In Fig. 9 there are shown the cathode follower $V_{42}$ and threshold detector $V_{43}$ of a gated frequency divider of the form of Fig. 4. A resistor $R_{91}$ is added between the cathode of $V_{42}$ and plate of $V_{43}$, and the plate of $V_{43}$ is connected to either of two coupling tubes $V_{92}$ and $V_{94}$ via a switch $S_{91}$. $R_{91}$ should be substantially smaller than $R_{43}$ of the $b$th stage, but substantially larger than the plate impedance at either of the tubes $V_{53}$ and $V_{54}$ in the feedback gating waveform generator to which point $g$ may be connected.

Of course the circuit may be constructed with either one of these coupling circuits alone, but since the diode $V_{92}$ effects increase in the over-all divider ratio by retarding the opening of the stop gate in the $b$th stage containing $V_{43}$ of Fig. 9, whereas $V_{94}$ effects decrease in the over-all divider ratio, the two coupling circuits may be conveniently provided together. Thus a switch $S_{91}$ is shown at the plate of $V_{43}$ arranged to connect that plate in one position to the plate of $V_{92}$ and in a second position to the cathode of $V_{94}$. The cathode of $V_{92}$ is connected to point $d$ in the plate of $V_{53}$ of the gating waveform generator of Fig. 5, and the plate of $V_{94}$ is connected to point $e$ in the plate of $V_{54}$ in Fig. 5. Accordingly, the cathode of $V_{92}$ receives a negative gate at the quotient frequency of the $k$th stage in the cascade, and the plate of $V_{94}$ receives a positive gate at the same frequency. Regardless of the position of switch $S_{91}$, the tubes $V_{92}$ and $V_{94}$ are without effect on the operation of stage $b$ except when a feedback signal arrives. Assume first that $S_{91}$ is connected to $V_{94}$. Although point $e$ in Fig. 5 rests at a voltage more positive than the cathode of $V_{42}$ during recycling, its voltage is less positive than the threshold value established in $V_{43}$, and when the active mode is initiated in the $b$th stage, point $f$ in the cathode of $V_{42}$ will rise and when it reaches the level of point $e$ in Fig. 5, $V_{94}$ will cut off, and the cycle in the $b$th stage will continue regardless of the presence of $V_{94}$. If $S_{91}$ is connected to $V_{92}$, the connection is again without effect on the operation of stage $b$ except when a feedback signal is received because point $d$ in Fig. 5 rests at B+ potential, and $V_{92}$ will remain cut off throughout the divider cycle in stage $b$.

If it is desired to reduce the over-all divider ratio switch $S_{91}$ is set to connect point $g$ with $V_{94}$. When a feedback pulse activates the gating waveform generator such as the tubes $V_{53}$ and $V_{54}$ of Fig. 5, $V_{54}$ is cut off, and there appears at point $e$ in Fig. 5 a positive gate. A conducting path is thereby created from B+ through the plate load of $V_{54}$ and through $V_{94}$ to point $g$ on the plate of $V_{43}$. The impedance from $g$ to ground is high so that the voltage at $g$ is raised to a value between B+ and the threshold level at the cathode of $V_{43}$. $V_{43}$ therefore conducts, and the gating waveform appears at point $h$ on its cathode. The $b$th stage is thereupon recycled an integral number of pulse periods earlier than usual. The waveforms at points $f$, $g$, and $h$ in Fig. 9 with connection of $S_{91}$ to $V_{94}$ are shown in Fig. 10, by reference to input pulses at M (Fig. 4) of the $b$th stage, and by reference to the voltage at $e$ in the plate of $V_{54}$ of the gating waveform generator. The gate width adjustment at $R_{53}$ of Fig. 5 need provide only a gate having approximately the width of one input pulse period to stage $b$, and the phase control is set to bring the leading edge of the gate in $V_{54}$ halfway between two input pulses of stage $b$.

If instead the over-all divider ratio is to be increased, the opening of the stop gate is retarded by applying a negative gate to the plate of $V_{43}$ via $V_{92}$. The phase of the feedback is adjusted at $R_{51}$ in Fig. 5 to initiate the feedback gate at the plate of $V_{53}$ some time during the active mode of conduction in the $b$th stage of the cascade, preferably half of an input pulse period to the $b$th stage prior to the normal stop pulse in that stage. The feedback gate is adjusted for the duration of an integral number of such input pulse periods. When the feedback signal appears from the $k$th stage, the voltage at $d$ in the plate of $V_{53}$ of Fig. 5 drops to a point substantially below the threshold voltage in the $b$th stage, whereas the voltage at $g$ on the plate of $V_{43}$ will have risen in consequence of the active mode above the reduced level at the plate of $V_{53}$. $V_{92}$ is therefore caused to conduct. Since $R_{91}$ has an impedance substantially higher than the plate-to-ground impedance of $V_{53}$, the plate of $V_{43}$ is caused to drop nearly to the level of the plate in $V_{53}$. Accordingly $V_{43}$ is prevented from conducting, and the formation of the stop gate at $h$ is prevented until the feedback gate is removed from $V_{92}$. With $S_{91}$ connected to $V_{92}$, the waveforms at $f$, $g$ and $h$ in Fig. 9 are shown in Fig. 11 with reference to the input pulses to the $b$th stage containing $V_{42}$ and $V_{43}$ of Fig. 9 and with reference to the waveform at $d$ in the plate of $V_{53}$.

Figure 12:
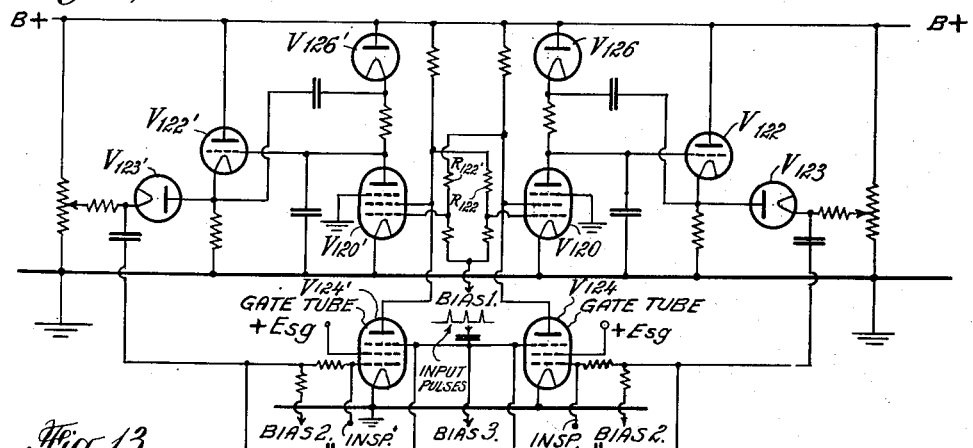
Fig. 12 is a schematic diagram of a gated frequency divider including two characteristic waveform generators and two gating circuits, to which the present invention is applicable by operation on either of its characteristic waveforms.

The gated frequency divider of Fig. 4 includes a single waveform generator carried through active and passive modes, the passive mode having a length of one input pulse period. Gated frequency dividers may however be constructed in which two separate waveform generators are employed, the duration of the active mode for one serving as the recycling period for the other. The active phases of the two need not of course be of the same length. Such a gated frequency divider is shown in Fig. 12. It consists of two waveform generators similar to $V_{40}$, $V_{42}$, $V_{43}$, $V_{46}$, $R_{42}$ and $C_{41}$ of Fig. 4 and of two gating circuits each including a tube analogous in function to $V_{44}$ of Fig. 4. In Fig. 12 $V_{120}$ and $V_{120'}$ thus correspond to $V_{40}$ of Fig. 4, $V_{122}$ and $V_{122'}$ to $V_{42}$, $V_{123}$ and $V_{123'}$ to $V_{43}$ and $V_{126}$ and $V_{126'}$ to $V_{46}$. The screen grid and control grid circuits of the condenser charging switch tubes $V_{120}$ and $V_{120'}$ form a single two-mode switching section interconnecting the two waveform generators. The control grid of $V_{120}$ is thus coupled to the screen grid of $V_{120'}$ through a resistor $R_{122}$ while the control grid of $V_{120'}$ is coupled to the screen grid of $V_{120}$ through a resistor $R_{122'}$. The stop gate opening wave form from $V_{123}$ is applied to the control grid of a gating tube $V_{124}$ to whose suppressor grid the input pulses to the stage are applied. A similar gating tube $V_{124'}$ is connected in corresponding fashion for the waveform generator having primed reference characters. The feedback circuits of the invention shown in block form in Fig. 3 and in schematic form in Figs. 5, 7, 8 and 9 are applicable to either half of the divider stage of Fig. 12. Thus in particular if one half of Fig. 12 (that having primed reference characters for example) is considered as a starting circuit for the other, the advance or retardation of the stop gate disclosed in connection with the coupling circuit of Fig. 9 may be applied as well to the stop gate of the primed half of Fig. 12, considered as a starting circuit for the other half.

Figure 13:
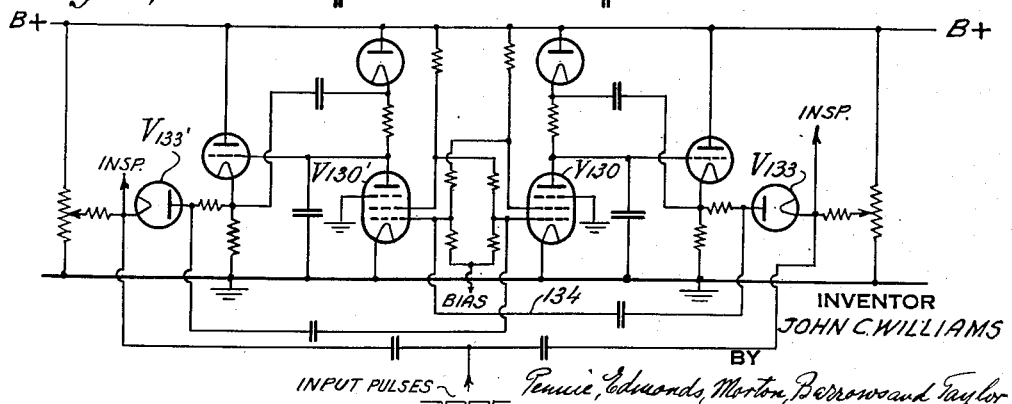
Fig. 13 is a schematic diagram of a variant from the circuit of Fig. 12 to which the feedback circuit of the present invention is also applicable.

The gated frequency divider of Fig. 12 is direct coupled between its two halves by means of resistors $R_{122}$ and $R_{122'}$ and is not self-starting. If $R_{122}$ and $R_{122'}$ are replaced by condensers, the divider will be rendered self-starting, and it will also oscillate even in the absence of input pulses. A gated frequency divider having two wave-form generators in the same sense as that of Fig. 12 but which is self-starting though non-oscillatory is shown in Fig. 13. It comprises a combination of two gated dividers according to the embodiment of Fig. 7 of my copending application above-identified. The gated frequency divider there described operates with negative input pulses. The separate gating tube of the embodiment of Fig. 4 is dispensed with, and the threshold detector tube serves as a stop gate as well. When the threshold voltage is reached, a negative input pulse is passed through the threshold detector (functioning as a stop gate) to the conducting half of the switching section in order to terminate the active phase of the characteristic waveform. Two waveform generators of this type combined back to back in a fashion analogous to that illustrated in Fig. 12 for the frequency divider of Fig. 4 are shown in Fig. 13. The waveform generators are essentially the same as those of Fig. 12. When the stop gate opens in the half of the circuit having unprimed reference characters, upon conduction at the threshold detector $V_{133}$, the next arriving negative input pulse is passed by that tube and transmitted by a line 134 to the control grid of $V_{130'}$ in the other half of the divider. $V_{130'}$ is cut off thereby, and $V_{130}$ is restored to conduction. Upon this change the active mode is initiated in the generator having primed reference characters, and the recycling mode is re-initiated in that having unprimed reference characters. The stop pulse from each half therefore serves as a start pulse for the other.

The divider circuit of Fig. 13 has the advantage that although it is self-starting it is non-oscillatory in the absence of input pulses. Feedback signals for alternation of the divider ratio in a cascade including a stage of the form of Fig. 13 can be applied with any one of the feedback coupling circuits previously described.

Feedback for change of the divider ratio of a cascade can also be applied according to the invention by direct injection of a feedback pulse (or of a pulse derived therefrom) into the switching section of an early stage in the cascade in order to reverse the mode of conduction in that stage. The feedback pulse itself may be employed or, preferably, an input pulse to that stage selected by a coupling circuit employing the feedback signal to actuate it. In this way the desirable integral character of both modes in the early stage may be preserved in spite of the generally arbitrary phase of the feedback pulse with regard to the input pulses to the stage operated upon.

Change of divider ratio by injection of a feedback or feedback selected pulse results in decrease of the over-all divider ratio since it effects premature reversal of phase in the divider stage operated upon. This reversal can be applied to shorten either the active or passive phase of conduction in the stage operated on, except that of course in dividers of the type of Fig. 4 in which one phase is only one input pulse long, no further reduction in the length of that phase can be made. Even in dividers of the type of Fig. 4 however, a moderately large condenser $C_f$ connected across $R_{47}$ (Fig. 4) will give a non-adjustable recycling period several input pulses long which may then be so reduced in length periodically.

Suitable coupling circuits for application of the feedback pulse to shorten either the active or recycling phases in the stage operated on are shown in Fig. 14. To shorten the active phase of a waveform generator the negative gate at point $b$ in the plate of the normally non-conducting tube $V_{51}$ of the phasing circuit in Fig. 5 is differentiated at $C_{141}$, $R_{141}$ to produce a positive pulse shown at waveform $t_{(1)}$ in Fig. 15. The diode $V_{140}$ clips the negative differentiated peaks and permits the positive peaks to reverse the conduction phase of the $b$th stage via switch $S_{141}$ which connects with the control grid of V₄₀ in the stage operated on (or with either control grid in the swtiching section of a divider of the type shown in Figs. 12 and 13). If, in the case of a divider stage both of whose conduction phases are more than one input pulse period long, it is desired to reduce the duration of the recycling period, S₁₄₁ may be set to connect the switching section of the stage operated on with the diode 142. The positive gate at the plate of V₅₂ (or V₅₄) in the feedback loop (Fig. 5) is applied to V₁₄₂ via C₁₄₂ and R₁₄₂ to produce on the plate of V₁₄₂ a negative pulse as shown at t₍₂₎ in Fig. 15. During the passive or recycling phase of conduction in the bth stage, the grid in the switching section of the bth stage to which S₁₄₁ connects will be at zero bias and the negative pulse at the plate of V₁₄₂ will reverse the phase of conduction in the bth stage, initiating the active mode there.

To maintain the individually integral character of the active and recycling periods making up the quotient cycle altered by feedback when using directly injected pulses without having to rely upon the phase adjustment in the feedback loop, a coupling circuit of the form shown in Fig. 16 may be used to permit selection on an input pulse to the bth stage by means of the feedback pulse. In Fig. 16 a coupling tube V₁₆₀ receives on its control grid positive input pulses to the bth stage to be operated on and, on its suppressor grid, a positive gate as from the plate of V₅₄ in the gating waveform generator of Fig. 5. The plate of V₁₆₀ may be connected either to the grid of V₄₅ or to the control grid of V₄₀ (Fig. 4) in the bth stage by means of a switch S₁₆₀, according to the feedback signal is to shorten the active or passive phase of conduction in the bth stage. For shortening of the active phase the feedback gate should be adjusted in phase to place the start of the feedback gate half of an input pulse period to the bth stage prior to the arrival of the desired input pulse. Gate width is set at one such input pulse period.

For shortening of the passive phase the feedback gate should be phased to place its beginning approximately one-half of an input pulse period to the stage operated on prior to the arrival (during the passive phase there) of the input pulse to be employed to terminate the passive phase.

In either event the negative pulse at q in the plate of V₁₆₀ reverses the mode of conduction of the switching section in the stage operated on. Of course the supply of input pulses to the coupling tube V₁₆₀ is in addition to the regular supply of input pulses to the stage operated on.

I claim:

1. In a frequency dividing circuit including in cascade two or more gated frequency dividers each of which comprises a waveform generator, a switching section having two modes of conduction, a threshold detector, and a stop gate, a feedback connection between a subsequent and a prior stage in the cascade, said connection between a subsequent and a prior stage in the cascade, said connection being adapted to shift integrally the number of cycles of the input signal required to be supplied to the first stage to produce one output cycle from the last stage, said connection comprising means to derive from the subsequent stage a feedback signal having the repetition rate of the quotient frequency of the subsequent stage, and means employing said feedback signal to alter when applied the division ratio of said prior stage.

2. In a cascade of frequency dividers each of which includes a saw-tooth condenser voltage circuit controlled by a switch tube, a switching section having a stable and an unstable mode of conduction, means linking the switching section and the switch tube to shut off conduction in the latter while the former is in its unstable mode, a threshold detector to which is applied the output of the saw-tooth condenser circuit, and a gate opened by the excess of the saw-tooth voltage above the threshold value, said gate being adapted when open to pass input pulses to the switching section for regenerative reversal thereof to the stable mode when in the unstable mode, a feedback connection between a subsequent stage and a prior stage adapted to shift integrally the number of cycles of input signal required to be supplied to the first stage in order to produce one output cycle from the last stage.

3. In a cascade of two or more frequency dividing stages each of which includes a saw-tooth condenser voltage circuit controlled by a switch tube, a switching section having a stable and an unstable mode of conduction, means linking the switching section and the switch tube to shut off conduction in the latter while the former is in its unstable mode, a threshold detector to which is applied the output of the saw-tooth condenser circuit and a stop gate opened by the excess of the saw-tooth voltage above the threshold value, said gate being adapted when open to pass input pulses to the switching section for regenerative reversal thereof to the stable mode when in the unstable mode, a feedback connection between a subsequent stage and a prior stage comprising a phasing circuit, means to apply to the phasing circuit a signal derived from the output cycle of the subsequent stage, a monostable delay multivibrator, means to apply the output of the phasing circuit to the multivibrator to shift it to its unstable mode of conduction, means to apply a substantially rectangular voltage waveform characteristic of the unstable mode of the multivibrator to the threshold detector in the prior stage, whereby the threshold voltage in the prior stage is altered for the duration of said rectangular voltage.

4. In a cascade of two or more frequency dividing stages each of which includes a saw-tooth condenser voltage circuit controlled by a switch tube, a switching section having a stable and an unstable mode of conduction, means linking the switching section and the switch tube to shut off conduction in the latter while the former is in its unstable mode, a threshold detector to which is applied the output of the saw-tooth condenser circuit, and a stop gate opened by the excess of the saw-tooth voltage above the threshold value, said gate being adapted when open to pass input pulses to the switching section for regenerative reversal thereof to the stable mode when in the unstable mode, a feedback connection between a subsequent stage and a prior stage comprising a phasing circuit, means to apply to the phasing circuit a signal derived from the output signal of the subsequent stage, a monostable delay multivibrator, means to apply the output of the phasing circuit to the multivibrator to shift it to its unstable mode of conduction, a diode having one of its electrodes coupled to the plate of the threshold detector in the prior stage, and means to apply a substantially rectangular voltage waveform characteristic of the unstable mode of the multivibrator to the other electrode of said diode, said phasing circuit being adjusted to initiate the said rectangular voltage waveform before the saw-tooth voltage in the prior stage reaches the level established in the threshold detector.

5. In a frequency dividing device including two or more gated frequency dividers in cascade, a feedback connection between a stage subsequent to the first and a prior stage adapted to alter by a small integral number the number of input pulses required to be supplied to the first stage to produce a final output pulse from the last, said connection comprising a phasing circuit, means to apply to the phasing circuit a pulse-shaped signal derived from the subsequent stage, a shaping circuit adapted to derive a trigger signal from the output of the phasing circuit, and means to apply the trigger signal to the switching section of the prior stage.

6. In a cascade of two or more frequency dividers each of which includes a saw-tooth condenser voltage circuit controlled by a switch tube, a switching section having a stable and an unstable mode of conduction, a connection between the switching section and the switch tube shutting off conduction in the latter while the former is in its unstable mode, a threshold detector including a diode to one of whose electrodes is applied the output of the saw-tooth condenser circuit and whose other electrode is biased to a chosen threshold voltage, and a gate opened by the excess of the saw-tooth voltage beyond the threshold value, said gate being adapted when open to pass input pulses to the switching section for regenerative reversal thereof to the stable mode when in the unstable mode, the provision of a feedback connection between a subsequent stage and a prior stage, said connection being adapted to shift integrally the number of cycles of input signal required to be supplied to the first stage in order to produce one output cycle from the last stage, said connection comprising a phasing circuit, means to apply to the phasing circuit a repetitive pulse-shaped signal derived from the output signal of the subsequent stage, a shaping circuit adapted to derive a trigger signal from the output of the phasing circuit, a gating generator controlled by the trigger signal and adapted to derive a substantially square wave, and means to apply the square wave to one of the electrodes of the threshold detector diode of the prior stage so as to alter the time of opening of the gate therein, the phasing circuit being adjusted to initiate the square wave before the normal opening of the gate in the prior stage.

7. In a cascade of two or more frequency dividers each of which includes a saw-tooth voltage waveform generator, a switching section having a stable and an unstable mode of conduction, means linking the switching section and the waveform generator to activate the latter while the former is in its unstable mode, a threshold detector to which is applied the output of the saw-tooth condenser circuit, and a gate opened by the excess of the saw-tooth voltage above the threshold value, said gate being adapted when open to pass input pulses to the switching section for regenerative reversal thereof to the stable mode when in the unstable mode, the provision of a feedback connection between a subsequent stage and a prior stage, said connection being adapted to shift integrally the number of cycles of input signal required to be supplied to the first stage in order to produce one output cycle from the last stage, said connection comprising a phasing circuit, means to apply to the phasing circuit a signal derived from the subsequent stage and having the repetition rate of the quotient cycle of the subsequent stage, a shaping circuit adapted to derive a trigger signal from the output of the phasing circuit, and means to apply the trigger signal to the switching section of the prior stage at such a point as to induce a regenerative reversal in the mode of conduction in the switching section of said prior stage.

8. In a cascade of gated frequency dividers, means to alter the over-all division ratio of the cascade by integral amounts which may be less than the least product of the ratios of all stages of the cascade except one, said means comprising a phasing circuit, means to apply to the phasing circuit a signal having the repetition rate of the quotient frequency of a stage later than the first stage of the cascade, a gate voltage generator coupled to the output of the phasing circuit, and a coupling circuit applying the output of the gate voltage generator to a stage prior to said later stage.

9. In a cascade of gated frequency dividers each including a waveform generator, an electron-tube circuit having two modes of conduction controlling the waveform generator, and start and stop gates controlling access to said two-mode circuit of input pulses to the divider, a feedback circuit from a later to an earlier divider of the cascade, said feedback circuit including means to generate at the quotient frequency of said later divider and at adjustable phase with respect thereto a substantially rectangular waveform, and an electron discharge tube receiving on one of its electrodes input pulses to said earlier divider and on another of its electrodes said rectangular waveform.

10. In a frequency dividing device including a plurality of gated frequency dividers connected in cascade, a feedback connection from a later to an earlier divider of the cascade, said connection including means to derive a signal of adjustable phase with respect to the quotient cycle in the later divider, means to derive from said signal a voltage of substantially rectangular waveform, and coupling means to withhold during the existence of said waveform the input pulses from said earlier divider.

11. In a frequency dividing device including a plurality of gated frequency dividers connected in cascade, a feedback connection from a later to an earlier divider of the cascade, said connection including means to derive a signal of adjustable phase with respect to the quotient cycle in the later divider, means to derive from said signal a voltage of substantially rectangular waveform, and a gating circuit actuated by said waveform through which input pulses to said earlier divider are passed to reverse the conduction phase thereof.

12. In a cascade of gated frequency dividers each including a waveform generator, a switching section having two modes of conduction, a start gate and a stop gate, means to alter the divider ratio of the cascade comprising means to derive from the quotient cycle of a stage in the cascade subsequent to the first a substantially rectangular waveform, and an electron discharge tube to one of whose electrodes said waveform is applied and to another of whose electrodes are applied the input pulses to an earlier stage of the cascade.

13. In a cascade of gated frequency dividers each including a waveform generator, a switching section having two modes of conduction, a start gate and a stop gate, means to alter the divider ratio of the cascade comprising means to derive from the quotient cycle of a stage in the cascade subsequent to the first a substantially rectangular waveform, and a clamping tube connected in parallel to one of the tubes in the switching section of an earlier stage of the cascade, said rectangular waveform being applied to a grid of said clamping tube.

14. In a cascade of gated frequency dividers each including a waveform generator controlled by a switch tube, an electron-tube circuit having two modes of conduction controlling the conduction in the switch tube and a gating tube through which input pulses to the divider are passed to said two-mode circuit for reversing the mode of conduction thereof, means to change the divider ratio of the cascade from the product of the ratios of its separate dividers comprising means to derive from a divider later than the first a substantially rectangular waveform at the quotient frequency of said later divider, a clamping tube having its plate coupled to the plate of a tube in the two-mode circuit of a divider prior to said later divider, and means to apply said rectangular voltage to a grid of said clamping tube.

15. In a frequency dividing circuit including a plurality of gated frequency dividers connected in cascade, each of said dividers including a waveform generator, a switching section having two modes of conduction, a threshold detector, and a stop gate; means to alter the divider ratio of the cascade comprising a first variable delay multivibrator, means to trigger the first multivibrator with a signal derived from a stage in the cascade later than the first, a second multivibrator, means to trigger the second multivibrator with a signal from the first, a diode having one of its electrodes connected to the plate of the threshold detector in a stage prior to said later stage, and means to apply to the other electrode of said diode a rectangular waveform from said second multivibrator.

16. In a cascade of gated frequency dividers each including a waveform generator controlled by a switch tube, an electron tube circuit having two modes of conduction controlling the conduction in the switch tube and a gating tube through which input pulses to the divider are passed to said two-mode circuit for reversing the mode of conduction thereof, means to change the divider ratio of the cascade from the product of the ratios of its separate dividers comprising means to derive from a divider of the cascade later than the first a pulse-shaped signal at the repetition rate of the quotient frequency in said later divider, and means to apply said pulse-shaped signal to the two-mode circuit of an earlier divider.

17. In a cascade of gated frequency dividers each including a waveform generator controlled by a switch tube, an electron tube circuit having two modes of conduction controlling the conduction in the switch tube and a gating tube through which input pulses to the divider are passed to said two mode circuit for reversing the mode of conduction thereof, means to change the divider ratio of the cascade from the product of the ratios of its separate dividers comprising means to derive from a divider later than the first a substantially rectangular waveform at the quotient frequency of said later divider, a coupling tube operated at cut off bias and having applied to one grid thereof input pulses to a divider prior to said later divider and having said rectangular waveform applied to another of its grids, and means to couple the plate of said coupling tube to the control grid of a tube in the two-mode circuit of said earlier divider.

18. In a cascade of gated frequency dividers, a divider ratio changing circuit comprising means to derive from a divider of the cascade subsequent to the first a signal having the repetition rate of the quotient frequency in such subsequent divider, a variable delay device, a gate voltage generator, a coupling circuit connected ahead of a point of application of input pulses to a divider of the cascade prior to said subsequent divider, and means to apply the output of said gate voltage generator to said coupling circuit, whereby during application to said coupling circuit of said gate voltage input pulses are prevented from passing through said coupling circuit.

19. In a cascade of gated frequency divider stages, a divider ratio changing circuit comprising means to derive from a stage of the cascade subsequent to the first a signal having the repetition rate of the quotient frequency in said subsequent stage, a variable delay device, a gate voltage generator, a clamping tube biased to cut off connected in parallel with a tube of the two-mode circuit in a stage of the cascade prior to said subsequent stage, and means to apply a positive gate voltage from said generator to the grid of said clamping tube.

References Cited in the file of this patent

UNITED STATES PATENTS

| Number | Name | Date |
| --- | --- | --- |
| 2,487,191 | Smith | Nov. 8, 1949 |
| 2,500,581 | Seeley | Mar. 14, 1950 |